May 15, 1945.  LE ROY E. COBB  2,375,894
KNOB ASSEMBLY FOR CONTROL DEVICES
Filed Aug. 3, 1944
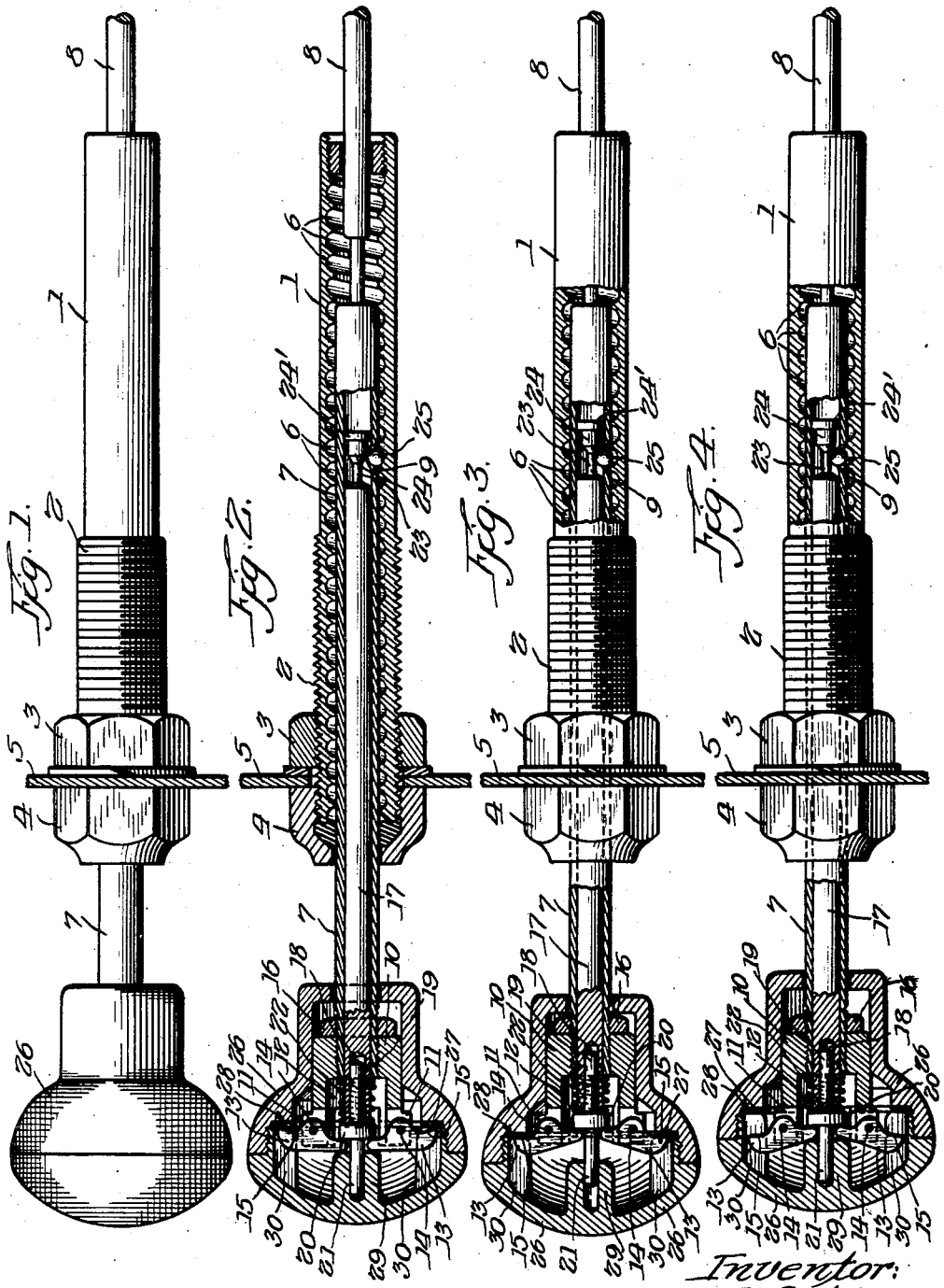
Inventor:
Leroy E. Cobb
By W. F. Kellogg
Atty.

Patented May 15, 1945

2,375,894

UNITED STATES PATENT OFFICE 2,375,894

KNOB ASSEMBLY FOR CONTROL DEVICES

Le Roy E. Cobb, Kalamazoo, Mich., assignor to Shakespeare Products Company, Kalamazoo, Mich., a corporation of Michigan Application August 3, 1944, Serial No. 547,895

11 Claims. (Cl. 74—503)

This invention relates to control devices employed for transmitting linear control motion to controlled apparatus or mechanisms, as for illustration, the throttle valves of combustible fuel supply devices or apparatuses of air, land or marine vehicles, whereby the speed of the equipped motors may and will be, at all times, capable of being governed by a user to the particularly desired or required degree, both under normal and emergency operating conditions; the improvements being especially advantageous when adapted to that type of control such as described in and claimed by the United States patent issued to Henry G. Shakespeare, February 17, 1942, No. 2,273,334.

More particularly, an object of the invention is to provide a knob assembly for the indicated, as well as certain other types of control devices, so constructed as to effect automatic release of the motion transmitting element per se, for control adjustment upon the application of either pull or push forces thereto, and yet, ensure the positive and completely dependable retention of said element in an adjusted position, hence, faithfully responsive operation of the controlled apparatus or mechanism.

Furthermore, it is an object of my invention to provide a knob assembly for control devices or mechanisms, wherein instantaneous and sure release of an equipped motion transmitting device or element, for movement, will be made with the application of simple pull or push force thereto, and so, enable the user to effect and maintain absolute and proper regulation of the controlled apparatus or mechanism, even under conditions or at times when he may be subject to great or bewildering mental stresses or strain and irrespective of his competence and dexterity.

Moreover, it is an object of the invention to provide a knob assembly of the stated character, incorporating in its construction, release means which operate automatically, merely and solely, by and through the grasping of the knob and the delivery of either pull or push force thereto, in contradistinction to control devices whose release means require, for their operation, the special manipulation of release devices or means in addition to its normal operation.

It is also an object of the invention to provide a knob construction capable of advantageous use in connection with those types of control devices whereby several characters of control adjustment or control motion transmittal may be effected (1), coarse or so-called quick adjustment, and (2), vernier or fine adjustment.

Other objects of the invention will be in part obvious and in part pointed out hereinafter.

In order that the invention and its mode of operation may be readily understood by those skilled in the art to which it appertains, I have in the accompanying drawing and in the detailed following description based thereupon, set out one embodiment of my invention.

In this drawing:

Figure 1 is a side elevation of a control device provided with my improved knob assembly, showing a portion of the connecting rod broken away.

Figure 2 is a longitudinal section through the control mechanism, as above, and the improved knob assembly, with the latter in its neutral position.

Figure 3 is a longitudinal section through the control mechanism, with parts shown in elevation, through the improved knob assembly, wherein the latter is shown in its outwardly pulled position with respect to the adjusting member, preparatory to the transmittal of pull force to the adjusting member, and Figure 4 is a similar section wherein the knob assembly is shown in its inwardly pushed position, preparatory to the transmittal of push force to the adjusting member.

Having more particular reference to the drawing, in connection with which like characters of reference will designate corresponding parts throughout, I have shown, for purposes of illustration only, my improved knob assembly upon a control device such as described and claimed in the aforesaid patent to Henry G. Shakespeare, No. 2,273,334, consisting of a tubular body 1, of appropriate length, externally screw threaded, as at 2, to facilitate the adjustable engagement of relatively opposed mounting nuts 3 and 4 therewith, in order that the tubular supporting body 1 may be satisfactorily secured or connected to the control panel 5 of an airplane, automobile or other vehicle equipped with the device. The supporting body 1 is also suitably provided with a continuous internal screw thread 6, preferably in the form of a cross-sectionally semi-circular helical groove, for a purpose which will be hereinafter described.

Received within the tubular supporting member 1, for axial sliding and rotary movement, is a tubular adjusting member 7, whose normally far end is swivelly connected to a connecting rod 8, appropriately attached to the adjacent end of a flexible cable (not shown). An opening or way 9 is formed in a portion of the tubular adjusting member for a purpose hereinafter more fully explained, though it should be here noted that said way 9 in the adjusting element is normally within the tubular supporting body 1. Screw threads are externally provided to the near end portion of the body 1 and receive thereupon a cross-sectionally circular mounting member 10, fixedly carrying upon its outer end, diametrically opposed, longitudinally slotted bearing brackets or arms 11, while the adjacent portion of said member is circularly or otherwise appropriately chambered, as at 12. Dogs 13 are pivotally mounted, as at 14, within the longitudinally slotted portions of the brackets 11, and as will be noted upon reference to the Figures 2, 3 and 4, have certain of their ends disposed inwardly in substantially relatively opposed relationship, while their outer ends extend from or beyond the brackets 11 mounting the same, in outwardly opposed relation. It is also desirable that these outwardly disposed and extended ends of the dogs 13 shall have portions of their inner edges or sides substantially flattened, as at 15, whereby to effect flush or substantially flush engagement with the adjacent side of a hardened or surface hardened washer, hereinafter more fully described. To securely retain or lock the mounting member 10 upon said externally screw threaded near end portion of the adjusting member 7, I may and preferably do turn a locking nut 16 onto such screw threaded portion and into binding or locking engagement with the adjacent side of the mounting member, in the manner clearly shown in Figures 2, 3 and 4 of the accompanying drawing.

Slidably received within the tubular adjusting member 7 is a control or release rod, generally indicated by the numeral 17. This rod is normally positioned so that its inner or near end extends for a distance outwardly of and beyond the corresponding end of the tubular adjusting member 7 and has a co-axially disposed outwardly opening bore 18 formed therein fixedly receiving the pin 19 of a circularly shaped bearing head 20 therein; the outer side of said head 20 fixedly carrying a coaxially disposed and outwardly extending pin 21. An expansible coiled spring 22 is engaged about the aforesaid extended end of the release rod 17 and has its opposite ends in bearing engagement with adjacent portions of the tubular adjusting member 7 (or if desired, the inner side of the chambered portion 12 of the mounting member 10) and the bearing head 20. The tension of the spring 22 is such that the release rod 17 will be normally retained in that position shown in Figure 2 of the drawing, capable, however, of inward movement with respect to said adjusting member, during certain operational steps.

The opposite or remaining end of the slidable release rod 17 is equipped with cam means operable in a manner to optionally establish or disestablish connection between the adjusting member 7 and the tubular supporting body 1 in order that, first, the adjusting member may be rotated within the supporting body to provide for fine or vernier adjustment in a desired direction, and second, the adjusting member may be slid within the supporting body to provide for quick and coarse adjustment. These means comprise the pin 23 fixedly carried by and disposed co-axially of the release rod 17, having an inwardly tapered cam element 24, whose overall diameter is somewhat greater than that of the pin, but less than that of the rod, mounted on its free end, and a cylindrical guide body 24', integral with its outer end portion, the diameter of which, preferably, corresponds to that of the release rod, for an obvious purpose. A ball or spherical body 25 is engaged in the way 9 of the adjusting member 7 and is normally engaged by the cam element 24 in a manner to be moved laterally thereby into engagement with the adjacent portion of the helical groove 6 within the tubular supporting body 1. Thus, connection between the latter and the adjusting member 7 will be established (see Figure 2) for permitting rotatable fine or vernier adjustment of the adjusting member. However, when the release rod 17 is forced and slid inwardly of the body 1, the tapered end portion of the cam element 24 will be moved with respect to the ball 25, allowing it to move inwardly with respect to the way 9 into the adjusting member 7, and hence, be disengaged from said helical groove 6 in order that quick and coarse sliding adjustment of said adjusting member may be effected with relation to the tubular supporting body 1.

A knob or knob shell, consisting of a sectional screw-threadedly joined body 26 is provided the control device. The normally inner side section of the shell is reduced or pocketed and snugly receives the mounting member 10 and locking nut 16 therein. An appropriate opening is formed in the extremity of such reduced portion and, as shown, permits of longitudinal introduction or passage of the adjusting member 7 and the release rod 17 thereinto. A washer 27 is flushly seated upon the outer face or side of an annularly shouldered portion 28 formed within said inner shell section and, as hereinbefore stated, is adapted to be engaged by the flattened portions 15 of the diametrically opposed and pivotally mounted dogs 13. This washer 27, preferably, is formed of material sufficiently hard or wear-resistant to prevent scoring or similar marking thereof by the flattened portions of said dogs when engaged therewith. The outer or near knob shell section is formed or otherwise provided with diametrically opposed internally thickened portions, each of which are longitudinally slotted, as at 30, while the central portion of said section is formed or otherwise provided with an internally and longitudinally disposed pocketed extension 29, co-axially aligning with the pin 21 and slidably receiving the same therein, as shown by Figures 2, 3 and 4 of the drawing. The outer end portions of each of the pivotally mounted dogs 13 are engaged in and are movable through the longitudinal slots or ways 30 of the aforesaid thickened portions of the outer knob shell section. Thus, it will be seen that whereas pivotal movement of the dogs 13 will be permitted, their engagement in and through said slots 30 will serve to effect connection between the assembled knob shell and the adjusting member 7, in order that the latter may be rotated within the tubular supporting body 1 to effect the hereinbefore referred to fine or vernier adjustment of the control device.

In operation of a control device provided with my improved knob assembly, it is to be first noted that said knob assembly will be normally retained in that position shown in Figure 2 of the accompanying drawing. In such position, it will be seen that rotative driving connection will be established between the adjusting member 7 and the tubular supporting body 1 through the ball 25, in the manner hereinbefore described. Consequently, with rotation of the knob shell, collective rotation of the adjusting member 7 will be effected for securing or providing fine or vernier adjustment of the control device. When outward coarse and quick adjustment of the adjusting member 7 is desired or required, and particularly, outward sliding movement of said adjusting member 7 with respect to the tubular supporting body 1, the knob shell 26 is grasped and pulled outwardly by the operator. Thereby, said knob shell will be moved to a position such as shown in Figure 3 of the drawing, during which the washer provided internally shouldered portion 28 of the knob shell will engage and move the outer ends of the pivotally mounted dogs 13 outwardly, causing their respective inner ends to be moved inwardly into force imparting engagement with the bearing head 20 connected to the release rod 17 and moving the latter, against the tension of the expansible coiled spring 22, to the position shown in Figure 3 of the accompanying drawing. In such position, it will be observed that the tapered portion of the cam element 24 will be moved by and somewhat beyond the ball 25, and so, will allow the latter to become freely disengaged from the helical groove 6 within the tubular supporting body 1. At this time, connection between the adjusting member 7 and the tubular supporting body 1 will be dis-established and the former will be allowed to have outward sliding movement in order to secure the desired quick and coarse adjustment, aforesaid. Obviously, when the knob shell 26 is released by the operator, the previously compressed coiled spring 22 will cause return of the pivotally mounted dogs 13 and the knob shell to their normal or neutral positions, as shown in Figure 2 of the drawing.

When coarse and quick adjustment of the control device is desired through the effecting of inward sliding movement of the adjusting member 7 in the tubular supporting body 1, the operator then grasps or engages the knob shell 26 and forces the same inwardly, moving it against the resistance of the expansible coiled spring 22 and causing the pocketed extension 29 to slidably engage over the adjacent pin 21, bringing the latter into direct engagement with its bottom, as shown in Figure 4, whereupon, with further inward movement of the knob shell, the release rod 17 will be slid inwardly to cause movement of its cam 24 to release position (see Figure 4) and allow disengagement of the groove engaging ball 25 from the tubular supporting body 1, as hereinbefore explained. At such time, coarse and quick inward sliding adjustment of the adjusting member 7, to the desired extent or degree, will be permitted. And again, it will be noted that with release of the knob shell 26 by the operator, it, together with the pivotally mounted dogs 13 and the release rod 17 with its cam means, will be returned, under urge of the expansible coiled spring 22, to its normal position, shown in Figure 2 of the drawing.

Through the medium of my improved knob assembly, the locking elements constituted by the ball 25, the release rod 17 and its cam means 24, can be overpowered in the stress of an emergency. And inasmuch as the release rod 17 must be pushed to become released, it is of material importance that either a push or pull on the knob 26 will serve to effect this release. Such an emergency might, for example, arise or occur during the landing of an airplane equipped with the improved control device, wherein it becomes necessary to change the motor speed quickly to adjust to unexpected conditions or happenings, i. e., landing the airplane upon an unfamiliar air field, or when an emergency landing becomes necessary, etc.

I claim:

1. A knob assembly for the slidable and rotatable adjusting member and the movably associated release member of a control mechanism, comprising mounting means carried by the adjusting member, a knob shell slidably carried by the mounting means about certain of the end portions of said adjusting and release members, motion translating and transmitting means on the mounting means operable by and upon sliding movement of the knob shell for imparting sliding movement in a predetermined direction to the release member, and means engaging the release member for normally retaining it in a predetermined position.

2. A knob assembly for the slidable and rotatable adjusting member and the movably associated release member of a control mechanism, comprising mounting means carried by the adjusting member, a knob shell slidably carried by the mounting means about certain of the end portions of said adjusting and release members, motion translating and transmitting means on the mounting means connected to the knob shell and operable by and upon sliding movement of said knob shell for imparting sliding movement in a single direction to the release member, and means engaging said release member for normally retaining it in a predetermined position.

3. A knob assembly for the slidable and rotatable adjusting member and the movably associated release member of a control mechanism, comprising mounting means on the adjusting member, a knob shell slidably carried by the mounting means about certain of the end portions of said adjusting and release members, motion translating and transmitting means on the mounting means operable by and upon sliding movement of the knob shell in either of two directions for imparting sliding movement in a single direction to the release member, and means engaging the release member for normally retaining it in a predetermined position.

4. A knob assembly for the slidable and rotatable adjusting member and the movably associated release member of a control mechanism, comprising a knob shell slidably carried by the adjusting member about certain of the end portions thereof and the release member, motion translating and transmitting means in said knob shell operatively connecting the same to said release member and operable by and upon sliding movement of the knob shell in either of two directions for imparting sliding movement in a predetermined direction to said release member, and means engaging the release member for normally retaining it in a predetermined position with relation to said adjusting member.

5. A knob assembly for the slidable and rotatable adjusting member and the movably associated release member of a control mechanism, comprising mounting means fixedly carried on the free portion of the adjusting member, a knob shell slidably carried by the mounting means about the free end portions of said adjusting and release members, means on the mounting means operable by the knob shell upon sliding movement thereof in one direction, for transmitting sliding movement in an opposite direction to said release member, and means engaging the release member for normally retaining it in a predetermined position with relation to said adjusting member.

6. A knob assembly for the slidable and rotatable adjusting member and the movably associated release member of a control mechanism, comprising mounting means fixedly carried by the adjusting member, a knob shell mounted for limited sliding movement on said mounting means engaging about the free end portions of said adjusting and release members, means on the mounting means connected to the knob shell and operable thereby upon sliding movement of said knob shell in one direction, for transmitting sliding movement in an opposite direction to said release member, and means engaging the release member for normally retaining it in a predetermined position with relation to said adjusting member.

7. A knob assembly for the slidable and rotatable adjusting member and the movably associated release member of a control mechanism, comprising mounting means fixedly carried by a portion of the adjusting member, a knob shell slidably carried by the mounting means about certain of the end portions of said adjusting and release members, means on the mounting means operable by the knob shell upon sliding movement thereof in one direction for transmitting sliding movement in an opposite direction to said release member, other means carried by the knob shell directly engageable with the release member for imparting sliding movement to the same upon sliding movement of said knob shell in a second direction, and means engaging the release member for normally retaining it in a predetermined position with relation to said adjusting member.

8. A knob assembly for the slidable and rotatable adjusting member and the movably associated release member of a control mechanism, comprising mounting means fixedly carried on the free end portion of the adjusting member, a knob shell movably carried by the mounting means about the free end portions of said adjusting and release members, motion translating and transmitting means on the mounting means engageable, upon movement of said knob shell in a predetermined direction, with portions of the knob shell and with the release member whereby to impart sliding motion to the latter, and means engaging the release member for normally retaining it in a predetermined position.

9. A knob assembly for the slidable and rotatable adjusting member and the movably associated release member of a control mechanism, comprising mounting means fixedly carried by a portion of the adjusting member, a knob shell movably carried by the mounting means about the free end portions of said adjusting and release members, motion translating and transmitting means on the mounting means connecting the knob shell to the adjusting member and engageable, upon movement of said knob shell in a predetermined direction, with portions of the knob shell and with the release member, whereby to impart sliding motion to the latter, means on the knob shell engageable with the release member upon movement of the same in an opposite direction for imparting sliding motion thereto, and means engaging the release member for normally retaining it in a predetermined position with relation to said adjusting member.

10. A knob assembly for the slidable and rotatable adjusting member and the movably associated release member of a control mechanism, comprising mounting means fixedly carried on a portion of the adjusting member, a knob shell slidably carried by the mounting means engaging about the free end portions of said adjusting and release members, dogs pivotally mounted on said mounting means having portions engageable with said release member and other portions engageable with the knob shell upon movement thereof in one direction, means carried by the knob shell directly engageable with said release member on sliding movement of the same in another direction, and other means engaging the release member and the adjusting member for normally retaining the former in a predetermined position with relation to the latter.

11. A knob assembly for the slidable and rotatable adjusting member and the movably associated release member of a control mechanism, comprising mounting means fixedly carried by a portion of the adjusting member, a knob shell mounted for limited sliding movement upon said mounting means engaging about the free end portions of said adjusting and release members, dogs pivotally carried by said mounting means having portions of the same movably engaged with portions of the knob shell and adapted, at times, to have bearing engagement upon other portions of said knob shell with sliding movement of the same upon the adjusting member in one direction, other portions of said dogs engaging said release member, means carried by the knob shell directly engageable with said release member upon sliding movement of the knob shell in an opposite direction, and means engaging the release member for normally retaining it in a predetermined position with relation to said adjusting member.

LE ROY E. COBB.